June 9, 1936. E. E. UNDERWOOD ET AL 2,043,909
SELF THREADING MOTION PICTURE APPARATUS
Original Filed Dec. 4, 1925
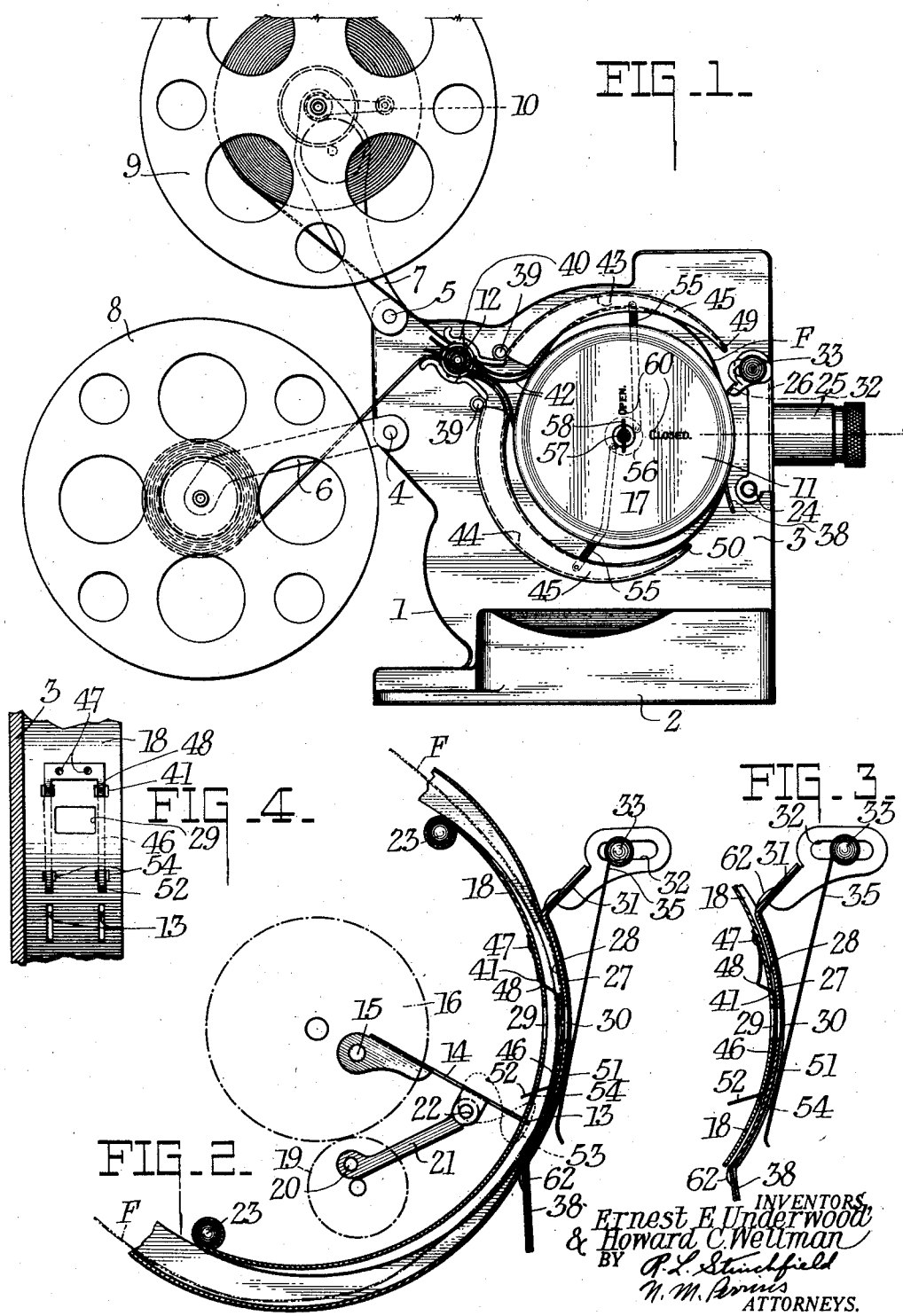

Patented June 9, 1936

2,043,909

UNITED STATES PATENT OFFICE

2,043,909

SELF THREADING MOTION PICTURE APPARATUS

Ernest E. Underwood and Howard C. Wellman, Rochester, N. Y., assignors to Eastman Kodak Company, Rochester, N. Y., a corporation of New York Application December 4, 1925, Serial No. 73,120
Renewed May 11, 1932

10 Claims. (Cl. 88—17)

This invention relates to motion picture apparatus and particularly to such apparatus in which is made provision for the automatic threading of the film. More specifically it relates to an improvement applied to the type of apparatus disclosed in the copending applications filed Dec. 4, 1925, Serial No. 73,119, of Adolph Stuber and E. E. Underwood, the latter being one of the present applicants, which application has become Patent 1,745,874, granted Feb. 4, 1930, and Serial No. 73,121 of H. C. Wellman, one of the present applicants, now Patent 1,878,215.

In this type of self threading apparatus a tunnel-like channel is provided through the machine so that, when the end of the film is introduced into one end, it will be guided automatically therethrough. The tunnel at the gate comprises separable members and the film tends to follow the outer one of these and thus avoids the claws which may protrude through the inner wall of the tunnel. If, however, the end of the film has a kink or bend it may encounter these claws. The object of our invention is to provide means insuring the avoidance of the claws by the film. This we do by providing a very light spring which, when the channel is open, will guard the claws and guide the film safely past them, but which will be retracted out of the gate by the greater force of the spring actuated pressure member when the latter closes.

Other objects and advantages will appear in the following description wherein reference is made to the accompanying drawing, in which the same reference characters designate the same parts throughout.

Fig. 1 is a side elevation of a projector embodying our invention;

Fig. 2 is a section of the gate assembly only, with the pressure member retracted;

Fig. 3 is a section of the gate with pressure member in closed position;

Fig. 4 is a front view of the guarding springs on the fixed gate member.

The apparatus, in the form shown, comprises a solid standard or frame 1 having a heavy base 2 and longitudinal walls 3. On the rear are pivoted at 4 and 5 arms 6 and 7 supporting reels 8 and 9 respectively, there being for the latter a rewind mechanism 10.

The partition carries a cylindrical casing 11 on one side about which the film F is looped, being propelled continuously from reel 9 and to reel 8 by sprocket 12, and being advanced intermittently by claw 13 on the arm 14 which is pivoted at the other end 15 to a driven disc 16 intergearing with disc 19 to which is pivoted at 20 a link 21 which is also pivoted at 22 to arm 14. The casing has a removable cover 17. The objective is carried by the usual mount 25 supported on plate 26 pivoted on stud 33 and held in place by a latch pin 24. The front part of the casing 11 consists of a sheet metal plate or arcuate member 18 the ends of which are supported on pins 23 on wall 3 and which has a window 29.

A presser member 27 for the film has an arcuate surface 28 adapted to fit against the side of the casing 11 and form with it a guide for the film as it passes the projection windows at 29 and 30 in these members. The members by which the film is held in position at, and guided past, the projection windows constitute the gate of the projector. At its upper end this presser member has an inclined arm 31 with a slot 32 having slidable engagement with pin 33 carried by wall 3. The end 35 of a spring coiled around pin 33 contacts the presser member and presses it toward the casing. The lower end of the presser member 27 has an inclined end 38.

A light spring 46 has one end 47 riveted to the inside of plate 18 and has a sharply bent portion 48 extending through a slot 41 in plate 18, then being again bent to form an arcuate portion 51 and an inwardly bent end 52, the latter extending through another slot 54 in the plate 18. The spring is at one side of and extends beside the window 29. When the presser member 27 is retracted to the position shown in Figure 4, the spring extends beyond the path of movement of the claw 13, this path being indicated at 53. Normally however, the greater strength of the spring 35 forces the presser member against plate 18 holding the light spring 46 in retracted position.

Near sprocket 12 are two trunnions 39 on which are pivoted two members 40 which are spring pressed toward the sprocket. Fixed guide members 42 extend between the flanges to the casing 11. Pivoted on the same trunnions are two symmetrically arranged guide members 43 and 44 which are U-shaped in cross section having side flanges 45.

The members 43 and 44 have links 55 connected to a common disc 56 pivoted on shaft 57 carried by a cover 17 and having an operating handle 58. The ends of members 43 and 44 are tapered as indicated at 49 and 50. When the handle 58 is turned from "open" to "closed" position, as indicated at 60, the members 43 and 44 are moved toward the casing and their ends 49 and 50 engage the inclined ends 31 and 38 and force the presser member, against springs 35, to slide on pin 33 by reason of slot 32. The protuberances 62 assist in this camming action.

There is thus left a channel past the exposure windows, and when the end of a perforated film is introduced between upper guides 40 and 42, it will be engaged by the teeth of sprocket 12 and be guided into the open channel provided between member 43 and casing 11. It will naturally follow member 43 around and will pass beneath member 27, the light spring 46 offering no obstacle to its progress but insuring that it will pass the claw 12 without operating engagement therewith. It will then be guided under member 44 and out past the sprocket.

It is to be understood that the above disclosure is by way of example and that we contemplate as included in our invention all such modifications and equivalents as properly fall within the scope of the appended claims.

Having thus described our invention, what we claim as new and desire to secure by Letters Patent is:

1. A motion picture apparatus having a gate structure adapted to provide a channel through which a film may be guided, a film feeding member having a path of movement extending partially across said channel and a spring extending into said channel and adapted to guide a film past said film feeding member without engagement therewith and movable out of said channel to permit a film to be engaged by the feeding member.

2. A motion picture apparatus having a gate structure comprising two complementary members yieldingly pressed together, film feeding means having a path of movement extending between said members to advance a film between them, said members being separable to provide a channel between them, and a light spring tending to move into the space between the members and adapted, when the members are separated, to guide a film past said feeding means without engagement therewith.

3. A motion picture apparatus having a gate structure comprising two complementary members yieldingly pressed together, film feeding means having a path of movement extending between said members to advance a film between them, said members being separable to provide a channel between them, and a light spring tending to move into the space between the members and adapted, when the members are separated, to guide a film past said feeding means without engagement therewith, the force of the spring being less than the pressure tending to force the two complementary members together, whereby the spring is retracted when the members are pressed together.

4. A motion picture apparatus having a gate structure comprising a fixed member and a pressure member, a film feeding means having a path of movement through said fixed member and adapted to engage and advance film between said members, said pressure member being normally near the fixed member but separable therefrom to a distance beyond the path of movement of the film feeding means, and a spring tending to move past the fixed member into the space between the members and held, when the members are together, out of such space by the pressure of the pressure member and movable, when the members are separated, into the space between them whereby it may guide film past said film feeding means without engagement therewith.

5. In motion picture apparatus, a series of sets of guide members constituting channels leading directly from one to the other to constitute a continuous, tunnel-like passage through the apparatus, each set comprising a member forming one wall of the tunnel and another member forming the opposite wall thereof and capable of directing a propelled film end successively through said series of sets of guides, a film feeding means having a normal cycle of movement between one set of said members to advance film between said members in the normal operation of the apparatus, and means for preventing said feeding means from operatively engaging the film whereby a propelled film end may pass through the channels without interference from said feeding means.

6. In motion picture apparatus, having a gate structure and pairs of channel forming members for directing a film to and from said gate, said pairs of channel forming members each comprising a fixed and a movable member, the movable members being connected for simultaneous movement whereby they may be moved toward the respective fixed members to constitute a narrow channel for the guidance of the film and whereby they may be moved away from the respective fixed members to afford space for film loops, the gate structure comprising two complementary members, film feeding means having a normal cycle of movement between said members to advance film through the gate between said members in the normal operation of the apparatus, and means for preventing said feeding means from operatively engaging the film whereby a propelled film end may pass through the gate without interference from said feeding means.

7. A motion picture apparatus having a gate structure comprising a fixed member and a presser member movable toward and from said fixed member, a film feeding means having a path of movement through said fixed member and adapted to engage and advance film between said members, said apparatus having also cooperating pairs of fixed and movable surfaces constituting a pair of channels for guiding a propelled film end to and from said gate, means for preventing said feeding means from operatively engaging the film when the presser member is moved away from said fixed member, whereby a propelled film end may pass through the gate without interference from said feeding means, and means for simultaneously moving the presser member toward the fixed member of the gate and the movable channel surfaces away from the fixed channel surfaces.

8. In a self-threading motion picture apparatus, an exposure gate comprising guide members forming a channel for the passage of a film band, sprocket means for feeding film continuously toward and from said gate, guide means to direct the lead end of a film propelled by the sprocket means toward and through the gate and from the gate to the sprocket whereby the film is automatically threaded through the apparatus, said guide means comprising members movable to and from film-directing position, and a film-feeding claw having a normal path of movement in the channel of the exposure gate for feeding a film band intermittently and means controlled by the movement of the movable members of the guide means and rendering the claw inoperative to feed the film when the said guide means is operative to thread a film end automatically.

9. In a self-threading motion picture apparatus, a gate structure including a channel for the passage of a film band, guide means to direct automatically the lead end of a film propelled endwise to and from the gate, a film feeding mechanism having a path of movement in said channel, mechanism operative on the guide means to render it operative or inoperative, and means controlled by the operation of said mechanism and rendering the feeding mechanism inoperative to feed the film when the guide means is operative to guide a film end.

10. In a self-threading motion picture apparatus, a gate structure including a channel for the passage of a film band, guide means to direct the lead end of a longitudinally propelled film to and from the gate and movable to and from film directing position, film feeding mechanism having a path of movement in said channel, and means controlled by the movement of the guide means and rendering the feeding mechanism inoperative to feed the film when the said guide means is operative to thread a film end.

ERNEST E. UNDERWOOD.
HOWARD C. WELLMAN.